United States Patent
Kumar

(10) Patent No.: US 12,192,238 B2
(45) Date of Patent: Jan. 7, 2025

(54) 0-RTT CAPABLE, TUNNEL-LESS, MULTI-TENANT POLICY ARCHITECTURE

(71) Applicant: CradlePoint, Inc., Boise, ID (US)

(72) Inventor: Puneet Kumar, San Jose, CA (US)

( * ) Notice: Subject to any disclaimer, the term of this patent is extended or adjusted under 35 U.S.C. 154(b) by 332 days.

(21) Appl. No.: 17/537,835

(22) Filed: Nov. 30, 2021

(65) Prior Publication Data
US 2023/0171290 A1 Jun. 1, 2023

(51) Int. Cl.
*H04L 9/40* (2022.01)
*H04L 43/0817* (2022.01)
*H04L 67/561* (2022.01)

(52) U.S. Cl.
CPC ........ *H04L 63/166* (2013.01); *H04L 43/0817* (2013.01); *H04L 63/0876* (2013.01); *H04L 67/561* (2022.05)

(58) Field of Classification Search
CPC ............. H04L 43/0817; H04L 63/0876; H04L 63/166; H04L 67/561; H04L 67/568; H04L 69/16; H04L 69/163
See application file for complete search history.

(56) References Cited

U.S. PATENT DOCUMENTS

| | | | | |
|---|---|---|---|---|
| 10,448,268 | B1* | 10/2019 | Jaya | H04W 76/19 |
| 2005/0216770 | A1* | 9/2005 | Rowett | H04L 63/101 726/5 |
| 2009/0116551 | A1* | 5/2009 | Nilsson | H04L 65/70 375/240.03 |
| 2012/0127973 | A1* | 5/2012 | Lin | H04L 1/0018 455/507 |
| 2016/0142293 | A1* | 5/2016 | Hu | H04L 45/745 370/392 |
| 2018/0249365 | A1* | 8/2018 | Cho | H04W 28/04 |
| 2018/0279002 | A1* | 9/2018 | Cugi | H04N 21/4627 |
| 2019/0273683 | A1* | 9/2019 | Jiang | G06F 9/45558 |
| 2019/0394129 | A1* | 12/2019 | Liao | H04L 47/10 |
| 2022/0045849 | A1* | 2/2022 | Jing | H04L 9/088 |
| 2022/0086070 | A1* | 3/2022 | Sivaraman | H04L 63/1425 |
| 2022/0132528 | A1* | 4/2022 | Changlani | H04W 72/121 |

(Continued)

*Primary Examiner* — Gary S Gracia
(74) *Attorney, Agent, or Firm* — Parsons Behle & Latimer

(57) ABSTRACT

Systems for packet handling over a network, the systems including a client device configured to communicate over a network, the client device further including a Multi Tenant Module-Client module (MTM-Client module) having processor-readable instructions to direct at least one client device processor to determine whether a packet is a Synchronize packet and, if so, the MTM-Client module opens a pair of streams with consecutive stream IDs to communicate over the network, and the first stream of the pair carries a 5-tuple and metadata for the communication from the client device, and the second stream of the pair carries the TCP packet for the communication from the client device. The systems further including a server device configured to communicate over the network with the client device, the server device further including a Multi Tenant Module-Server module (MTM-Server module) having processor-readable instructions to direct at least one server device processor to detect the 5-tuple and metadata from the first stream; and search for the next stream ID for the TCP packet, and the MTM-Server module saves the 5-tuple to an in-memory cache database.

20 Claims, 2 Drawing Sheets

(56) References Cited

U.S. PATENT DOCUMENTS

| | | | |
|---|---|---|---|
| 2023/0142354 A1* | 5/2023 | Kugler | H04L 47/323 370/235 |
| 2023/0171290 A1* | 6/2023 | Kumar | H04L 63/166 726/4 |

* cited by examiner

0-RTT CAPABLE, TUNNEL-LESS, MULTI-TENANT POLICY ARCHITECTURE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE DISCLOSURE

This disclosure relates generally to networking. More particularly, this disclosure relates to using Zero Round Trip Time Resumption (0-RTT) and multi-stream transport protocols (e.g., QUIC protocols) to improve packet handling in a network.

BACKGROUND

As agencies, companies, and enterprises increasingly move their applications to cloud-based services, and scale their user-base, they need to overcome the challenges posed by eliminating or distributing the traditional enterprise brick-and-mortar premises. For example, may enterprises allow employees to "hotel" at smaller, remotely located, shared spaces, to work from home, and/or to access the corporate network from anywhere via the cloud. Even if the traditional enterprise premises is shifted to the cloud, it is still essential for enterprises to channel their user traffic to their corporate network. After being moved to cloud, a corporate network is no longer a fixed location, therefore, applying network policies can be difficult and problematic, as network policies are usually based on assumptions for internal, fixed location networks.

Furthermore, it is typically in the interest of enterprises to protect network applications behind a gateway. For example, enterprises typically desire to allow users to access applications only after the user has been successfully authenticated and network policies have been applied. Typically, users should not be allowed to connect to the protected applications directly and enterprises usually protect Domain Name System (DNS) queries for the application by making a gateway, or similar node device, control access to the protected applications.

FIG. 1 schematically shows a typical enterprise network configuration. As shown, at least two types of users 102 may use an enterprise network 100. First, users 102A connected at a main office or a branch office 106A, 106B. Second, users 102B connected to a Virtual Private Network (VPN) 108. In both cases, upon connecting to the enterprise network 100, users 102 are assigned a private Internet Protocol (IP) address, known to the enterprise network 100 only. In general, each enterprise 100, 100A-100C, may assign each user 102 a unique policy 110 based on their network needs. This policy 110 is tied to the IP address (e.g., 112A, 112B) provided by the private enterprise network 100. Unfortunately, often, private network IP addresses are non-routable and hence, network design needs to accommodate the requirement of making policy engine 110 aware of the private enterprise network's particular IP policies. Because policy engine 110 is sitting in the cloud 116 and on a gateway 114, it is challenging for enterprises to apply policies based on these user's non-routable private network IP.

Some exemplary issues with the above-described types of solutions are provided next. Typically, gateway 114 solutions provided by vendors are shared by enterprises 100, 100A, 100B, 100C and each enterprise is treated as tenant by the vendor. Therefore, the cloud gateway 114 solutions provided by vendors are referred as Multi-tenant Cloud Solutions. FIG. 1 shows a multi-tenant cloud architecture, where multiple enterprises 100, 100A, 100B, 100C connect to the Gateway 114 provided by the vendor. One apparent problem in such an architecture is the overlapping of the private network IP addresses 112A and 112B (e.g., 192.168.x.x and 172.16.x.x). In addition to making a policy engine 110, residing in Gateway 114, aware of the private network IP addresses 112, Gateway 114 should also be able to distinguish the overlapping private network IP addresses from different enterprises (e.g., 100, 100A, 100B, 100C). A scalable and faster method is required to provide each private network IP address 112 an identification to distinguish itself based on the enterprise identity. Unfortunately, the way it is typically done today is by a hash of customer identification (e.g., tenant ID, site ID, etc.) and the 5-tuple (e.g., private network IP address/port number, destination IP address/port number, and protocol in use). Therefore the 5-tuple of the connection is currently a crucial part of identifying a customer.

Furthermore, the internet as we know it today, works on routable IP addresses 112. These routable IP addresses 112 are advertised by routing protocols such as Border Gateway Protocol (BGP) to different Internet Service Providers (ISPs). Since the private network IP addresses in an enterprise (e.g., 100A, 100B, 100C) are often not routable, a near-obsolete mechanism (i.e., secure 1.0.2 authentication protocol) is put in place for the policy engine 110 to be aware of the 5-tuple of private network IP addresses. As shown in FIG. 1, Gateway 114 includes several components such as auth 118, tunnel terminator 120, DNS proxy 122, and the like. All these Gateway 114 components obtain a connection identification by using a 5-tuple at various stage of the packet pipeline.

In another example issue, after a packet leaves the enterprise network 100 or it's VPN services 108, its source IP address 112 and source port will be changed to the WAN (Wide Area Network) 116 IP address and port, hence, the private network source IP address 112 and source port will be lost. In order to make policy engine 110 aware of the private network IP address, enterprises 100A, 100B, 100C typically rely on tunnels 124. A tunnel 124 is capable of encapsulation, which satisfies the need of encapsulating the original private network IP packet to be available for policy engine 110 in the cloud Gateway 114. These tunnels 124 are set up over WAN links 126 and secured either by in built security protocols (e.g., IPSec) or external protocols such as Transport Layer Security (TLS). One ubiquitous protocol which serves this purpose is IPSec. IPSec is trustworthy and has decades of maturity, which makes it a perfect protocol for tunneling. Among other things, IPSec provides: (i) confidentiality—ensures that data cannot be read by unauthorized parties; (ii) integrity—verifies that data was not modified during transit; and (iii) authentication—verifies the identity of the peers.

However, IPSec suffers from some shortcomings such as throughput limitations and heavy protocol overhead. Likewise, other tunneling protocols such as Generic Routing Encapsulation (GRE), are not suitable in the above-described situations, unless another provision such as Transport Layer Security (TLS) is applied implicitly in the application protocol. For example, HTTPS packets over GRE may be suitable, as it has both tunneling and security. However, this combination suffers from using significant protocol overhead. In addition, there are other problems with tunneling protocols. For example, for short lived connections, an IPSec tunnel quickly fills up and affects the throughput. These short-lived connections oftentimes are just idle. For example, if a user browses a website from phone, locks the phone and puts it back in their pocket, this creates a connection that will be closed only after timeout. Every connection from a user is tracked and NAT-ed while accessing the protected applications. One reason for that is to keep the user unaware of the application server's IP address and connect directly to the application without being authenticated. This requires resources to be assigned to each new connection. This resource assignment and release requires tracking each user connection, which is challenging as connections go and come frequently. Additionally, any change in the 5-tuple of enterprise's private network IP address, will trigger a connection close and mark any subsequent packets related to the 5-tuple invalid. This forces an enterprise's user to establish a new connection.

Another example problem arises with vendors that rely on TCP protocol for connection tracking, except IPSec over User Datagram Protocol (UDP). In IPSec over UDP, the underlying protocol is UDP which lacks the necessary intelligence to track connections, thus, IPSec over UDP does not provide connection tracking. Further, IPSec over UDP is a very CPU extensive process as well as imposes a high TCP overhead (e.g., especially from ACK operations), as a WAN link typically has thousands and thousands of connections.

Other drawbacks, inconveniences, and issues also occur in existing solutions.

SUMMARY

Accordingly, the herein disclosed embodiments address the above, and other, drawbacks, inconveniences, and issues with existing solutions. Disclosed embodiments include systems for packet handling over a network, the systems including a client device configured to communicate over a network, the client device further including a Multi Tenant Module-Client module (MTM-Client module) having processor-readable instructions to direct at least one client device processor to determine whether a packet is a Synchronize packet and, if so, the MTM-Client module opens a pair of streams with consecutive stream IDs to communicate over the network, and the first stream of the pair carries a 5-tuple and metadata for the communication from the client device, and the second stream of the pair carries the TCP packet for the communication from the client device. The systems further including a server device configured to communicate over the network with the client device, the server device further including a Multi Tenant Module-Server module (MTM-Server module) having processor-readable instructions to direct at least one server device processor to detect the 5-tuple and metadata from the first stream; and search for the next stream ID for the TCP packet, and the MTM-Server module saves the 5-tuple to an in-memory cache database.

In further disclosed embodiments, the metadata for the communication from the client device includes a site-id or a tenant-id.

In further disclosed embodiments, the MTM-Server module further includes processor-readable instructions to send the 5-tuple to a policy engine. In still further disclosed embodiments, the MTM-Server module further comprises processor-readable instructions to buffer the next consecutive stream ID until a go-ahead comes from the policy engine.

In further disclosed embodiments, the MTM-Server module further includes processor-readable instructions to send a reply packet over the same stream from the pair of streams from the client device that the TCP packet originated from.

Also disclosed are methods for packet handling over a network, the methods including communicating packets from a client device over a network, determining whether a packet is a Synchronize packet and, if so, opening a pair of streams with consecutive stream IDs to communicate over the network, and wherein the first stream of the pair carries a 5-tuple and metadata for the communication from the client device, and the second stream of the pair carries the TCP packet for the communication from the client device. The methods further including receiving the pair of streams at a server device communicating over the network with the client device, detecting, at the server device, the 5-tuple and metadata from the first stream, searching the next stream ID for the TCP packet, and saving the 5-tuple to an in-memory cache database.

In further disclosed embodiments the metadata communicated from the client device includes a site-id or a tenant-id.

In further disclosed embodiments the methods include sending the 5-tuple detected at the server device to a policy engine. In still further disclosed embodiments, the methods include buffering the next consecutive stream ID until a go-ahead comes from the policy engine.

In further disclosed embodiments, the methods include sending a reply packet over the same stream from the pair of streams from the client device that the TCP packet originated from. Other embodiments are also disclosed.

Figure 1:
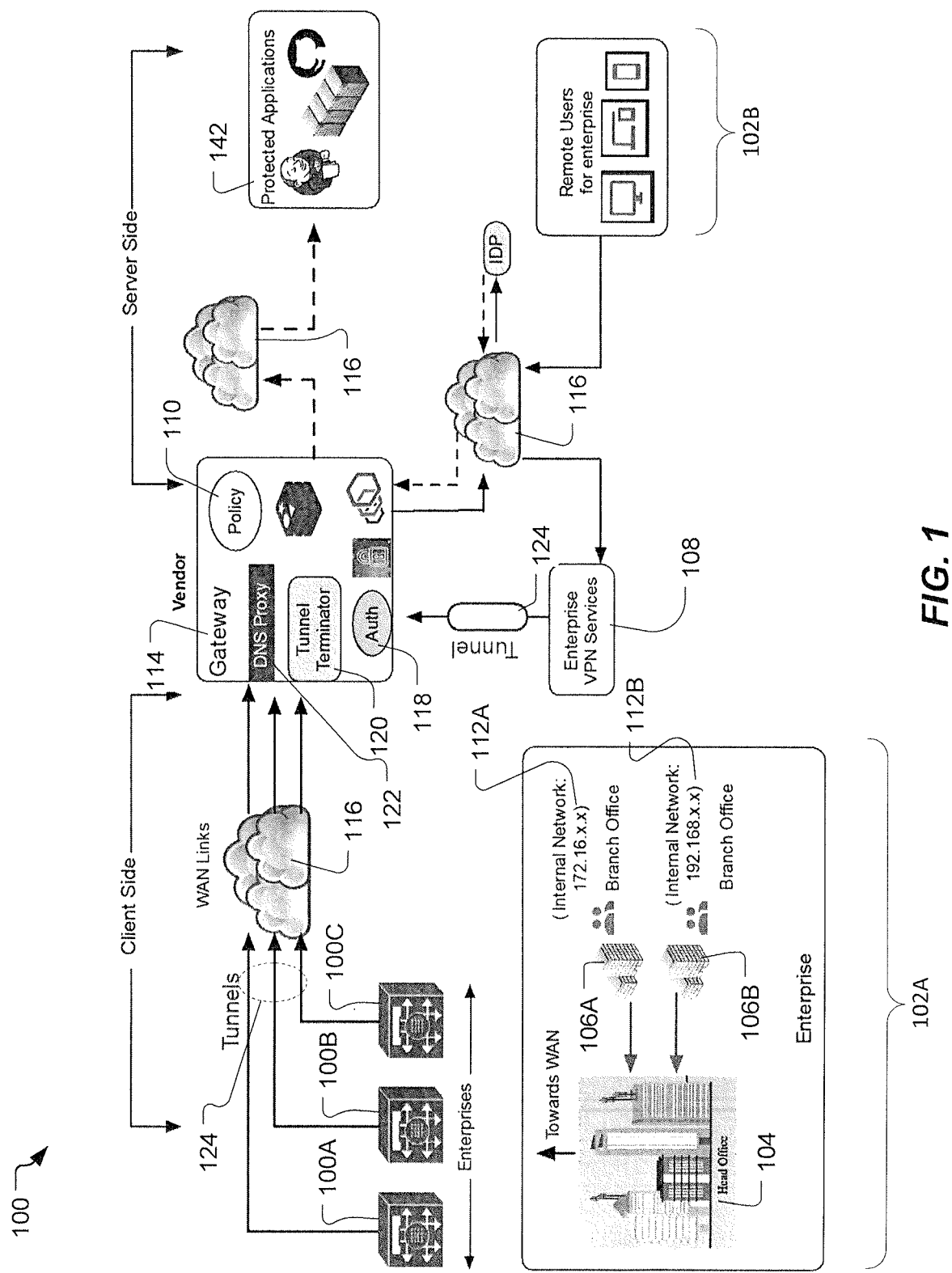
FIG. 1 is a schematic illustration of a typical enterprise network configuration.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION

The herein disclosed embodiments take a different and more efficient approach to the above-noted, and other, issues with existing systems and methods. Disclosed embodiments do not use a tunnel, do not need connection tracking, and have a mechanism in place to efficiently recognize each connection of overlapping IP addresses as disclosed herein.

Currently, extensible multi-stream transport protocols have in built security (such as QUIC). This eliminates any need for having additional support of security protocols. These extensible multi-stream transport protocols also have multiplexing capabilities to send more bytes into the wire. This enables sending more packets into one extensible multi-stream transport protocol packet, unlike traditional tunneling protocols such as IPSec, and to encapsulate each connection packet with its header. Also, extensible multi-stream transport protocols are fast enough to track connections with minimal protocol and round trip time overhead.

As disclosed herein, instead of using TCP, disclosed embodiments rely on multi-stream transport protocols (e.g., QUIC protocols). Multi-stream transport protocol packets are authenticated and fully encrypted (except packet number and caller ID (CID)). These user-space protocols solve the above-mentioned problems with the herein disclosed solutions and methods implemented over a multi-stream transport protocol.

Figure 2:
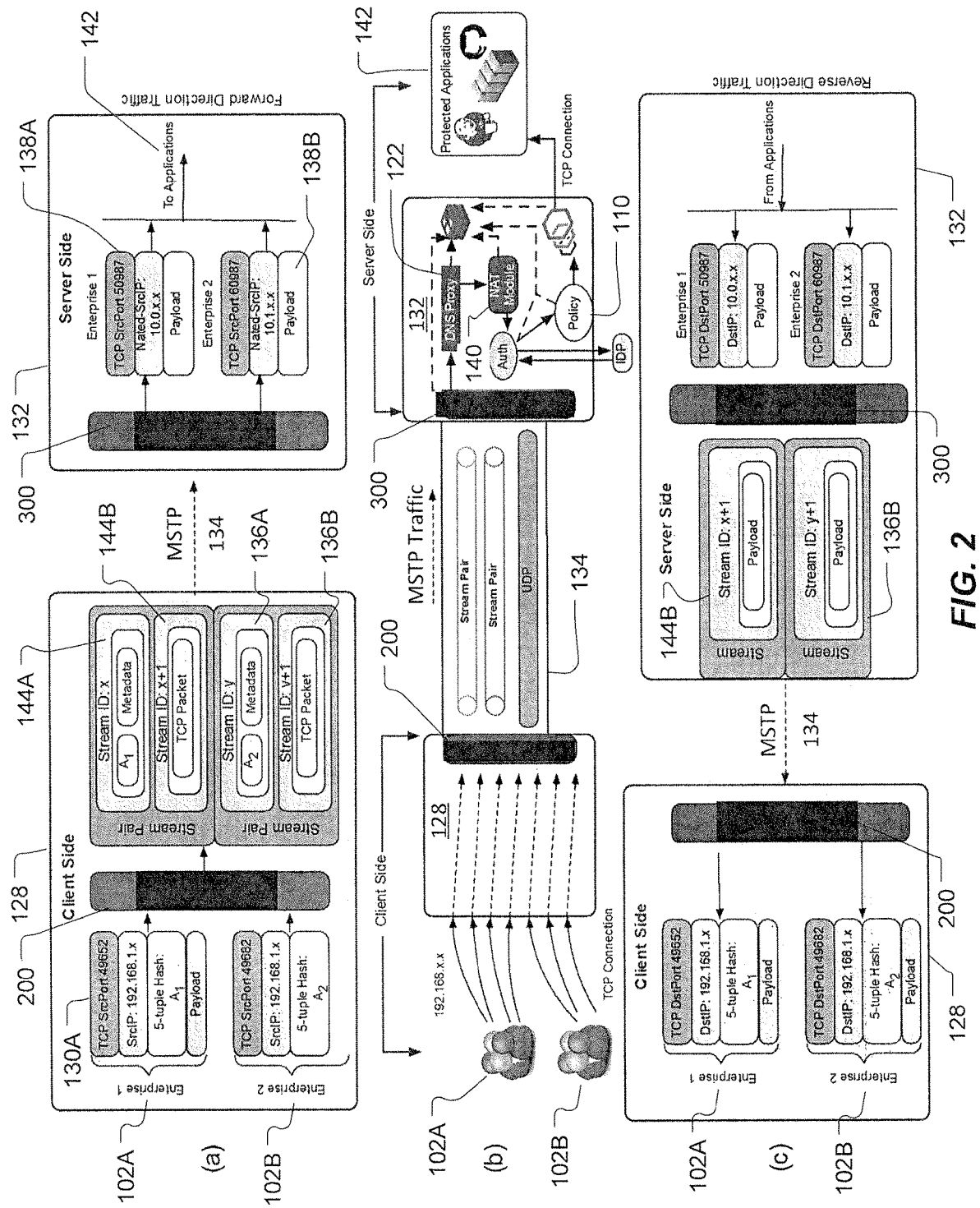
FIG. 2 is a schematic illustration of (a) the packet flow in the forward direction, (b) the high-level overall architecture, and (c) the packet flow in the reverse direction in accordance with disclosed embodiments.

FIG. 2 is a schematic illustration of (a) the packet flow in the forward direction, (b) the high-level overall architecture, and (c) the packet flow in the reverse direction. As used herein MTM stands for Multi-Tenant Module. As shown, TCP packets 130A, 130B originating from enterprise users 102A, 102B are intercepted on a client device 128 where it is distinguished based on the metadata such as site-ID and Tenant-ID.

As indicated, a multi-stream transport protocol (MSTP) connection 134 is created between client device 128 and server-side device 132. An MTM-Client module 200 intercepts the traffic from enterprise users 102A, 102B and determines the packet type. In some embodiments, there are two scenarios for transmitting packets: if the packet is a synchronize packet (SYN) packet (e.g., packet 130B) or if the packet is the acknowledge (ACK)/data packet (e.g., packet 130A). If the packet is a SYN packet (e.g., packet 130B), then MTM-Client module 200 opens two streams 136A, 136B with consecutive stream IDs (e.g., first stream ID=y and second stream ID=y+1). Since the streams 136A, 136B are a client-initiated streams then they will always be even number bidirectional streams. Here, these two streams 136A, 136B work as a pair. The first stream 136A of the pair only carries the 5-tuple and the metadata such as: site-id and tenant-id. The second stream 136B carries the entire TCP packet. Upon receiving the MSTP traffic 134 packet, MTM-Server module 300 dismantles the packet into a stream 138B. If MTM-Server module 300 encounters any streams carrying 5-tuple and metadata, it will search for the next stream ID (e.g., stream ID=y+1) for the payload in the packet and saves the 5-tuple to an in-memory cache database such as Redis or the like. This 5-tuple is given to policy engine 110 and upon successfully passing the policy check, TCP packet is extracted from stream and source NAT-ed from NAT module 140 to connect to the protected application 142.

In the above example embodiment, description of typical authentication (e.g., SYN/SYN-ACK/ACK) is not provides as it is unchanged from typical situations and is not relevant here. Further, the above example is for situations where a MSTP connection between a client 128 and server 132 is already established.

As also shown schematically, if a packet is a data packet (e.g., 130A) then it means that connection (i.e., MSTP traffic 134) is in established state and MTM-Client module 200 can find out the stream based on the 5-tuple and send the packet as a stream payload 138A.

In some embodiments, in order to handle faster SYN timeout, MTM-Client module 200 starts a timer for every stream carrying a SYN packet (e.g., packet 130B). If the SYN-ACK is not received even before the SYN timeout (i.e., a configurable timer), then MTM-Client module 200 sends the same SYN packet again. The receiver (e.g., MTM-Server module 300 on server 132) will, of course, send a Reset (RST) packet on the duplicate packet or the receiver might send a SYN-ACK packet on the duplicate. In both the cases, MTM-Client module 200 will know quickly that connections are working or not. For example, if a SYN-ACK packet is not received upon sending 3 consecutive SYN packets, then the connection may be declared dead.

In some embodiments, MTM-Client module 200 has a known buffering capacity per stream. If an ACK packet is not received, then MTM-Client module 200 sends the ACK packet before TCP timeout on the enterprise user 102A, 102B side, this way, MSTP traffic 134 will be able to detect any packet loss before timeout occurs.

As will be apparent to those of ordinary skill in the art having the benefit of this disclosure, many benefits exist for the above-described stream pairs 136A-B and 144A-B. For example, unlike IPSec and other tunnels, data (which is a SYN packet 136A, 144A) in this case) is transmitted in the first packet along with the connection identification such as 5-tuple, site ID and tenant ID. Therefore, a connection establishment for every user-initiated client 128 connection is not required. In addition, after finding any stream in the pair, it becomes easy to find out the other. For example, if a stream with a 5-tuple is found then, the next immediate stream ID has the payload. This obviates the need for tracking connections.

In addition, policy engine 110 has information about 5-tuple along with the data with 0-RTT, to run policies on the packets. Furthermore, a single MSTP 134 packet can have multiple stream pairs which alleviates bandwidth limitations, which is one of the major problems with IPSec. Also, the number of bytes transmitted in a stream is controlled by the streams' flow and congestion control.

In addition, every stream has offset to reorder the packets, which makes packet re-ordering more resilient than TCP. Further, there are several stream pairs (e.g., 136A-B, 144A-B) in the packet, which means several packets are inside one single MSTP packet 134. This reduces the protocol overhead compared to every tunnel packet bears with its IPSec and TCP header. Every MSTP packet 134 bears a short header, which can be as small as 2 bytes (e.g., if CID length is omitted) to 4 bytes. Which is much less than the 64 bytes (Standard) for IPSec and 20-40 bytes of TCP. Likewise, IPSec and other tunnel methods track the connection to represent the state of the tunnel, which is CPU-expensive, while if the MSTP connection 134 between client 128 and server 132 is down, it can re-establish based on Zero Round Trip Time Resumption (0-RTT). Other advantages also exist.

Table I below provides exemplary algorithm code for MTM-Client module 200 packet handling.

TABLE 1

MTM-Client Module Handling

| | |
|---|---|
| 1 | function (packet) |
| 2 |   5Tuple = Calculate5Tuple(packet) |
| 3 |   stream_id = 5Tuple |
| 4 |   if Packet to transmit then |
| 5 |     if pkt is SYN then |
| 6 |       x, x + 1 = Open_bi_directional_stream(stream_id) |
| 7 |       hash_table_save(5Tuple, state) |
| 8 |       start_timer_for_resend(syn) |
| 9 |       connection_state = SYN_SENT |
| 10 |     else |

TABLE 1-continued

MTM-Client Module Handling

| | |
|---|---|
| 11 | find_stream_id(5Tuple) |
| 12 | send_msg_on_stream( ) |
| 13 | start_timer_for_resend(nek) |
| 14 | else if Packet is recieved then |
| 15 | if pkt to SYN-ACK then |
| 16 | Connection_state = SYN-ACK |
| 17 | if pkt = hash_table_find(stream_id) then |
| 18 | send_to_user(pkt) |
| 19 | else |
| 20 | drop packet |
| 21 | return |

On the server 132 side, upon receiving a MSTP packet 134, each MSTP packet is dismantled into streams 138A, 138B. If a stream contains 5-tuple then this 5-tuple is send to policy engine 110 to run policy on it. As described herein, the next immediate stream (e.g., stream ID=x+1 or stream ID=y+1) will contain the payload which is buffered, until a go-ahead comes from policy. If a policy denies the connection for this 5-tuple then a stream close message is sent and MTM-Client module 200 will know to close the corresponding TCP connection on the user-client 128 side. MTM-Server module 300 also saves the 5-tuple and metadata in-memory cache to be served to other components later. A packet extracted from the MSTP stream 134 is given to NAT module 140 to perform source NAT and the TCP packet is sent to the protected applications 142.

For received traffic, a packet is sent over the same stream 136B, 144B it came from. This is because MTM-Client module 200 will know immediately that this is the reply for the TCP packet sent earlier.

Table II below provides exemplary algorithm code for MTM-Server module 300 packet handling.

TABLE II

MTM-Server Module Handling

| | |
|---|---|
| 1 | function (packet) |
| 2 | if packet is recieved then |
| 3 | if packet-is-SYN then |
| 4 | 5tuple, metadata = get_info(stream x) |
| 5 | if authenticate(pkt) then |
| 6 | pkt = get_packet(stream x + 1) |
| 7 | save_redis(5Tuple, metadata) |
| 8 | if policy_run(5-tuple) then |
| 9 | handover_to_nat_module(pkt) |
| 10 | else |
| 11 | send FIN on stream |
| 12 | else |
| 13 | if is_authenticated(pkt) then |
| 14 | pkt = get_packet(stream x + 1) |
| 15 | if policy_run(5-tuple) then |
| 16 | handover_to_nat_module(pkt) |
| 17 | else |
| 18 | send FIN on stream |
| 19 | else if Packet is to transmit then |
| 20 | stream_id = get_stream_id(5-tuple) |
| 21 | send_pkt_in_stream(pkt) |
| 22 | return |

As will be apparent to those of ordinary skill in the art having the benefit of this disclosure, other advantages and benefits of the above-disclosed systems and methods also exist. For example, the above disclosed use of MSTP also eradicates some of the problems inherent in TCP, such as every MSTP packet (e.g., 136A-B, 144A-B) (and even re-transmitted ones) has a packet number which eliminates any ambiguity. Likewise, there is no Head-of-Line blocking problems as MSTP is on UDP and UDP does not wait for any retransmission to keep the received packets hostage until all packets are arrived. Additionally, there is better congestion and flow control because MSTP provides per-stream congestion and flow control, which is why the bandwidth utilization in situations with no packet loss and few packet loss, is very high. This solves the problem of bandwidth utilization inherent in IP Sec.

Although various embodiments have been shown and described, the present disclosure is not so limited and will be understood to include all such modifications and variations are would be apparent to one skilled in the art.

What is claimed is:

1. A system for packet handling over a network, the system comprising:
   a client device configured to communicate over a network, the client device further comprising a Multi Tenant Module-Client module (MTM-Client module) comprising processor-readable instructions to direct at least one client device processor to intercept traffic from users and determines a packet type, wherein when a packet is a Synchronize packet, the MTM-Client module opens a pair of streams with consecutive stream IDs to communicate over the network; and
   the first stream of the pair carries a 5-tuple and metadata for the communication from the client device; and
   the second stream of the pair carries the TCP packet for the communication from the client device;
   a server device configured to communicate over the network with the client device, the server device further comprising a Multi Tenant Module-Server module (MTM-Server module) comprising processor-readable instructions to direct at least one server device processor to detect the 5-tuple and metadata from the first stream; and search for the next stream ID for the TCP packet; and the MTM-Server module saves the 5-tuple to an in-memory cache database, wherein the TCP is extracted from the stream and a connection is made to a protected application with the client.

2. The system of claim 1 wherein the metadata for the communication from the client device comprises a site-id or a tenant-id.

3. The system of claim 1 wherein the MTM-Server module further comprises processor-readable instructions to send the 5-tuple to a policy engine.

4. The system of claim 3 wherein the MTM-Server module further comprises processor-readable instructions to buffer the next consecutive stream ID until a go-ahead comes from the policy engine.

5. The system of claim 1 wherein the MTM-Server module further comprises processor-readable instructions to send a reply packet over the same stream from the pair of streams from the client device that the TCP packet originated from.

6. A method for packet handling over a network, the method comprising:
   communicating packets from a client device over a network;
   intercepting traffic from users;
   determining a packet type, wherein when a packet is a Synchronize packet, opening a pair of streams with consecutive stream IDs to communicate over the network; and
   wherein the first stream of the pair carries a 5-tuple and metadata for the communication from the client device; and the second stream of the pair carries the TCP packet for the communication from the client device;
receiving the pair of streams at a server device communicating over the network with the client device;
detecting, at the server device, the 5-tuple and metadata from the first stream;
searching the next stream ID for the TCP packet; and
saving the 5-tuple to an in-memory cache database, wherein the TCP is extracted from the stream and a connection is made to a protected application with the client.

7. The method of claim 6 wherein the metadata communicated from the client device comprises a site-id or a tenant-id.

8. The method of claim 6 further comprising sending the 5-tuple detected at the server device to a policy engine.

9. The method of claim 8 further comprising buffering the next consecutive stream ID until a go-ahead comes from the policy engine.

10. The method of claim 6 further comprising sending a reply packet over the same stream from the pair of streams from the client device that the TCP packet originated from.

11. A client device configured to communicate over a network comprising:
a Multi Tenant Module-Client module (MTM-Client module) comprising processor-readable instructions to direct at least one client device processor to intercept traffic from enterprise users and determines a packet type, wherein when a packet is a Synchronize packet, the MTM-Client module opens a pair of streams with consecutive stream IDs to communicate over the network; and
the first stream of the pair carries a 5-tuple and metadata which includes the site-id or tenant-id for the communication from the client device; and
the second stream of the pair carries a TCP packet for the communication from the client device; and
a service device is configured to receive the packet and dismantles the packet into a stream which is processed using a policy engine to validate the packet to establish a connection between the server and the client.

12. The client device of claim 11 wherein the metadata for the communication from the client device comprises a site-id or a tenant-id.

13. The client device of claim 11 wherein if a packet is a data packet the MTM-Client module determines the stream based on the 5-tuple and sends the data packet as a stream payload.

14. The client device of claim 11 wherein the MTM-Client module starts a timer for every stream carrying a Synchronize packet.

15. The client device of claim 14 wherein, if an Acknowledge packet is not received before the timer reaches a timeout, then the MTM-Client module sends the same Synchronize packet again.

16. A server device configured to communicate over a network with a client device, the server device further comprising:
a Multi Tenant Module-Server module (MTM-Server module) comprising processor-readable instructions to direct at least one server device processor to receive a plurality of packets and each packet is dismantled into streams, wherein when a stream contains a 5-tuple, then this 5-tuple is sent to a policy engine to run a policy on it and metadata from a first stream is detected; and search for the next stream ID for a TCP packet that will contain a payload that is buffered;
when a policy denies a connection for the 5-tuple then a stream close message is sent and the client device will close the corresponding TCP connection; and
when the policy approves the connection, the MTM-Server module saves the 5-tuple to an in-memory cache database, wherein the TCP is extracted from the stream and a connection is made to a protected application with the client.

17. The server device of claim 16 wherein the MTM-Server module further comprises processor-readable instructions to send the 5-tuple to a policy engine.

18. The server device of claim 17 wherein the MTM-Server module further comprises processor-readable instructions to buffer the next consecutive stream ID until a go-ahead comes from the policy engine.

19. The server device of claim 17 wherein if a policy of the policy engine denies the connection for a 5-tuple then the MTM-Server module sends a stream close message.

20. The server device of claim 16 wherein the MTM-Server module further comprises processor-readable instructions to send a reply packet over the same stream from a pair of streams received from the client device that the TCP packet originated from.

\* \* \* \* \*